(12) United States Patent
Baek et al.

(10) Patent No.: US 10,577,452 B2
(45) Date of Patent: Mar. 3, 2020

(54) CURABLE COMPOSITION

(71) Applicant: LG Chem, Ltd., Seoul (KR)

(72) Inventors: Si Yeon Baek, Daejeon (KR); Seung Min Lee, Daejeon (KR); So Young Kim, Daejeon (KR); Se Woo Yang, Daejeon (KR)

(73) Assignee: LG Chem, Ltd. (KR)

( * ) Notice: Subject to any disclaimer, the term of this patent is extended or adjusted under 35 U.S.C. 154(b) by 22 days.

(21) Appl. No.: 16/078,874

(22) PCT Filed: Oct. 19, 2017

(86) PCT No.: PCT/KR2017/011597
§ 371 (c)(1),
(2) Date: Aug. 22, 2018

(87) PCT Pub. No.: WO2018/088713
PCT Pub. Date: May 17, 2018

(65) Prior Publication Data
US 2019/0077904 A1 Mar. 14, 2019

(30) Foreign Application Priority Data

Nov. 11, 2016 (KR) .................. 10-2016-0150186

(51) Int. Cl.
| | |
|---|---|
| *C08G 18/61* | (2006.01) |
| *C08G 77/26* | (2006.01) |
| *C08L 83/00* | (2006.01) |
| *C08F 299/08* | (2006.01) |
| *C08G 18/10* | (2006.01) |
| *G02F 1/1333* | (2006.01) |
| *C09D 175/16* | (2006.01) |
| *C08L 75/16* | (2006.01) |
| *C08G 18/67* | (2006.01) |
| *C08G 77/20* | (2006.01) |

(52) U.S. Cl.
CPC ............ *C08G 18/61* (2013.01); *C08F 299/08* (2013.01); *C08G 18/10* (2013.01); *C08G 18/672* (2013.01); *C08G 77/20* (2013.01); *C08G 77/26* (2013.01); *C08L 75/16* (2013.01); *C08L 83/00* (2013.01); *C09D 175/16* (2013.01); *G02F 1/1333* (2013.01); *G02F 1/133305* (2013.01); *G02F 2202/28* (2013.01)

(58) Field of Classification Search
CPC ...... C08G 18/672; C08G 77/20; C08G 77/14; C08G 18/06; C08G 18/61; G02F 1/133305; C09J 183/04
See application file for complete search history.

(56) References Cited

U.S. PATENT DOCUMENTS

| | | | |
|---|---|---|---|
| 4,801,622 A * | 1/1989 | Inoue .................. | C08J 9/02 521/134 |
| 6,180,741 B1 | 1/2001 | Yamaguchi et al. | |
| 2015/0075710 A1 | 3/2015 | Lu et al. | |
| 2015/0210797 A1 | 7/2015 | Tamura et al. | |

FOREIGN PATENT DOCUMENTS

| | | |
|---|---|---|
| EP | 1029011 A1 | 8/2000 |
| JP | 2013173927 A | 9/2013 |
| JP | 2014001341 A | 1/2014 |
| KR | 20010006365 A | 1/2001 |
| KR | 100475843 B1 | 9/2005 |
| KR | 20110137959 A | 12/2011 |
| KR | 20140136551 A | 12/2014 |
| KR | 20150023278 A | 3/2015 |
| TW | 201420741 A | 6/2014 |
| WO | 0237143 A2 | 5/2002 |

OTHER PUBLICATIONS

Extended European Search Report including Written Opinion for Application No. EP17870002.7 dated Apr. 1, 2019.
International Search Report for Application No. PCT/KR2017/011597, dated Jan. 25, 2018.
Taiwanese Search Report for TW Application No. 106136544, dated Jun. 7, 2018.

* cited by examiner

*Primary Examiner* — Kuo Liang Peng
(74) *Attorney, Agent, or Firm* — Lerner, David, Littenberg, Krumholz & Mentlik, LLP

(57) ABSTRACT

The present application relates to a curable composition and a use thereof. The present application can provide a curable composition having excellent physical properties such as adhesive durability as well as maintaining transparency even in a high-temperature and high-humidity environment. Such a curable composition can be usefully used for direct bonding between a filler and an optical member of a display device.

15 Claims, 1 Drawing Sheet

[Figure 1]
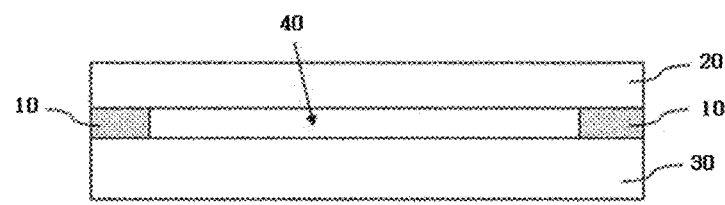
[Figure 2]
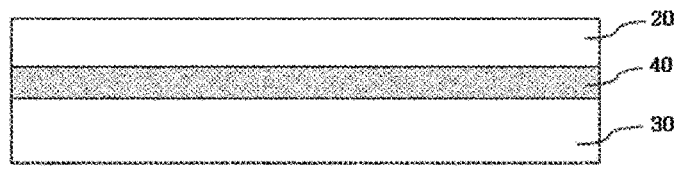

CURABLE COMPOSITION

CROSS-REFERENCE TO RELATED APPLICATIONS

The present application is a national phase entry under 35 U.S.C. § 371 of International Application No. PCT/KR2017/011597 filed Oct. 19, 2017, which claims priority from Korean Patent Application No. 10-2016-0150186 filed Nov. 11, 2016, the disclosures of which are incorporated herein by reference.

TECHNICAL FIELD

The present application relates to a curable composition and a use thereof.

BACKGROUND ART

Fillers for display decrease visibility due to display defects when an internal stress due to shrinkage occurs upon curing, and they may have a problem of transparency degradation due to discoloration when exposed to high temperatures. A silicone composition has been considered as a filler for display because it has properties suitable for solving a yellowing problem of such a curing shrinkage ratio (Patent Document 1: Japanese Laid-Open Patent Publication No. 2014-001341).

In addition, the filler for display is required to maintain transparency even in a high humidity environment, and generally, in the case of a silicone composition, the polydimethylsiloxane chain forming a main skeleton is highly hydrophobic, whereby a moisture content rate is lowered. Therefore, there is a problem that the moisture introduced when exposed to a high-temperature and humidity environment generates phase separation at room temperature to cause haze.

DISCLOSURE

Technical Problem

The problem of the present invention is to provide a curable composition having excellent physical properties such as adhesive durability as well as maintaining transparency even in a high-temperature and humidity environment and a filler for display using the curable composition.

Technical Solution

The present application relates to a curable composition capable of solving the above problem. The curable composition of the present application may comprise a curable component and a hydroxyl-containing component. The curable component may comprise a reactive silicone oligomer. The hydroxyl-containing component may comprise a non-reactive silicone oligomer having a hydroxyl group. The curable composition may comprise the reactive silicone oligomer in a ratio of 20 to 70 parts by weight. The curable composition may comprise the hydroxyl-containing non-reactive silicone oligomer in a ratio of 20 to 70 parts by weight. The hydroxyl-containing component may have a hydroxyl value (OH value) of 2 to 45 mg KOH/g.

Since the curable composition is based on a silicone oligomer, it is less problematic due to shrinkage and yellowing, and it comprises a hydroxyl-containing component capable of increasing moisture content rate, so that it can reduce haze even in a high-temperature and high-humidity environment.

In one example, the curable composition may have a haze after curing of 1.0% or less. Specifically, the haze may be 0.8% or less, 0.6% or less, or 0.4% or less. Therefore, the curable composition can ensure excellent transparency even in a high-temperature and high-humidity environment. The haze can be measured by Measurement Example 5. High-temperature and high-humidity haze measurement to be described below. Specifically, the haze can be measured with the turbidimeter ASTM D1003 standard by storing a specimen, in which the curable composition is cured to a thickness of 150 μm, at a temperature of 85° C. and a relative humidity of 85% for 1000 hours, and then leaving it at 25° C. and 50% relative humidity for 1 hour.

In this specification, the reactive silicone oligomer may mean a compound comprising a polysiloxane skeleton and comprising at least one curable functional group. The curable functional group may be exemplified by, for example, a (meth)acryl group.

In one example, the reactive silicone oligomer may comprise a polysiloxane-based urethane (meth)acrylate. The polysiloxane-based urethane (meth)acrylate may comprise a polysiloxane skeleton and may comprise at least one (meth)acrylic group at the terminals through urethane bonds. In this specification, the (meth)acrylate may mean acrylate or methacrylate, and the (meth)acryl group may mean an acryl group or a methacryl group. In one example, the reactive silicone oligomer may have no hydroxyl group.

The polysiloxane may be, for example, polydialkylsiloxane, and more specifically, polydimethylsiloxane.

The polysiloxane-based urethane (meth)acrylate may be a urethane reactant of a hydroxyl-containing polysiloxane, a polyfunctional isocyanate and a hydroxyl-containing (meth)acrylate. In this specification, the hydroxyl-containing compound may mean a compound having at least one hydroxyl group at the terminals.

The hydroxyl-containing polysiloxane may have at least one hydroxyl group at the terminals. The hydroxyl-containing polysiloxane may be, for example, a compound represented by Formula 1 below.

[Formula 1]

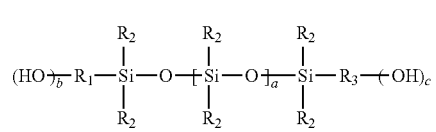

In Formula 1, $R_1$ and $R_3$ are each independently a hydrocarbon group or an organic group containing a hetero atom or an ether group, each $R_2$ is independently an alkyl group, a cycloalkyl group or a phenyl group, a is an integer of 10 or more, b and c are each independently an integer of 0 to 3, provided that the sum of b and c is 1 or more.

The hydrocarbon group may be, for example, a hydrocarbon group having 1 to 100 carbon atoms, specifically 1 to 25 carbon atoms, more specifically 1 to 5 carbon atoms, and may be a divalent or trivalent hydrocarbon group. As the divalent hydrocarbon group, for example, an alkylene group can be exemplified. The carbon number of the alkylene group is preferably from 1 to 10, and particularly preferably from 1 to 4, and for example, an ethylene group, a propylene group or a tetramethylene group, and the like can be exemplified.

As the organic group containing a hetero atom, for example, an oxyalkylene group, a polyoxyalkylene group, a polycaprolactone group or an amino group, and the like can be exemplified.

As the organic group containing an ether group, an ethyl ether group or the like can be exemplified.

In Formula 1 above, each $R_2$ may be independently an alkyl group, a cycloalkyl group or a phenyl group. The alkyl group may be, for example, an alkyl group having 1 to 15 carbon atoms, specifically 1 to 10 carbon atoms, more specifically 1 to 4 carbon atoms, such as, preferably, a methyl group, an ethyl group, a propyl group or a butyl group, and the like, and particularly preferably, a methyl group.

The cycloalkyl group may be, for example, a cycloalkyl group having 3 to 10 carbon atoms, specifically 5 to 8 carbon atoms, and for example, may be exemplified by a cyclopentyl group, a cyclohexyl group or a norbornyl group, and the like.

Furthermore, the alkyl group, cycloalkyl group and phenyl group may also have a substituent. The substituent may include, for example, a halogen atom, a hydroxyl group, an alkoxy group, an amino group, a mercapto group, a sulfanyl group, a vinyl group, an acryloxy group, a methacryloxy group, an aryl group or a heteroaryl group, and the like.

In Formula 1 above, a may be an integer of 10 or more, specifically an integer of 30 to 200, more specifically 40 to 120. b and c may be each independently an integer of 0 to 3, but the sum of b and c may be 1 or more, and for example, b and c may be each 1.

As the hydroxyl-containing polysiloxane, specifically, as a compound having a hydroxyl group at the terminal of polysiloxane, such as polydimethylsiloxane, polydiethylsiloxane and polymethylphenylsiloxane, for example, polydimethylsiloxane having a hydroxyl group at the terminal can be used. The polydimethylsiloxane having a hydroxyl group at the terminal can be exemplified by, for example, polydimethylsiloxane monool having one hydroxyl group at one terminal thereof, polydimethylsiloxane diol having two hydroxyl groups at one terminal thereof or polydimethylsiloxane diol having one hydroxyl group at each of both terminals thereof, and the like.

Specifically, the polydimethylsiloxane monool having one hydroxyl group at one terminal can be exemplified by X-22-4015 (manufactured by Shin-Etsu Chemical Industry Co., Ltd.), Silaplane FM-0411, FM-0412, FM-0425 (manufactured by Chisso Corp.), the polydimethylsiloxane diol having two hydroxyl groups at one terminal can be exemplified by Silaplane FM-DA11, FM-DA12 or FM-DA25 (manufactured by Chisso Corp.), and the polydimethylsiloxane diol having one hydroxyl group at each of both terminals can be exemplified by X-22-160 AS, KF-6001, KF-6002, KF-6003 (manufactured by Shin-Etsu Chemical Industry Co., Ltd.), Silaplane FM-4411, FM-4412 or FM-4425 (manufactured by Chisso Corp.), or macromonomer-HK-20 (manufactured by Toagosei Co., Ltd.), and the like.

As the polyfunctional isocyanate, a compound having at least two isocyanate groups may be used. Specifically, the polyfunctional isocyanate can be exemplified by diisocyanate, such as hexamethylene diisocyanate [HDI], isophorone diisocyanate [IPDI], methylene bis(4-cyclohexyl isocyanate) [H12MDI], trimethylhexamethylene diisocyanate [TMHMDI], tolylene diisocyanate [TDI], 4,4-diphenylmethane diisocyanate [MDI] and xylene diisocyanate [XDI], and the like. Furthermore, adducts in which diisocyanate is modified with trimethylolpropane, trimers (isocyanurate) of diisocyanate, burettes with reaction of diisocyanate and water, or the like, can be used alone or in combination of two or more thereof.

As the hydroxyl-containing (meth)acrylate, hydroxyalkyl (meth)acrylate can be used. The hydroxyl-containing (meth)acrylate can be exemplified by, for example, hydroxyalkyl (meth)acrylate such as 2-hydroxyethyl (meth)acrylate, 2-hydroxypropyl (meth)acrylate, 2-hydroxybutyl (meth)acrylate, 4-hydroxybutyl (meth)acrylate and 6-hydroxyhexyl (meth)acrylate, 2-hydroxyethyl acryloylphosphate, 2-(meth)acryloyloxyethyl-2-hydroxypropyl phthalate, caprolactone modified 2-hydroxyethyl (meth)acrylate, dipropylene glycol (meth)acrylate, fatty acid modified glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, 2-hydroxy-3-acryloyloxypropyl (meth)acrylate, pentaerythritol tri(meth)acrylate, caprolactone modified pentaerythritol tri (meth)acrylate, ethylene oxide modified pentaerythritol tri (meth)acrylate, dipentaerythritol penta(meth)acrylate, caprolactone modified dipentaerythritol penta(meth)acrylate or ethylene oxide modified dipentaerythritol penta(meth)acrylate, and the like, and these can be used alone or in a mixture of two or more.

The reactive silicone oligomer may have one or two or more curable functional groups at the terminals. More specifically, the reactive silicone oligomer may have 1 to 6, 1 to 4, or 1 to 3 curable functional groups at the terminals. In this specification, the reactive silicone oligomer having n curable functional groups at the terminals may be referred to as an n-functional silicone oligomer.

In one example, when the reactive silicone oligomer comprises a polysiloxane-based urethane (meth)acrylate, the n-functional silicone oligomer may mean a compound having n (meth)acryl groups in the polysiloxane skeleton through the urethane skeleton.

The curable component may comprise a silicone oligomer having any one specified number of curable functional groups or a mixture of reactive silicone oligomers having different numbers of curable functional groups.

In one example, the curable component may be a mixture of a monofunctional silicone oligomer and a bifunctional silicone oligomer. When the bifunctional silicone oligomer is included alone, a modulus may be too high, and when the monofunctional silicone oligomer is included alone, cohesive force is lowered, so that adhesive durability may be weakened. Therefore, when a mixture of a monofunctional silicone oligomer and a bifunctional silicone oligomer is used, it is possible to improve various properties as a curable composition. The curable component may further comprise a silicone oligomer having three or more functionalities.

The curable composition may comprise a reactive silicone oligomer in a ratio of 20 to 70 parts by weight. When the curable component is a mixture of a monofunctional silicone oligomer and a bifunctional silicone oligomer, the monofunctional silicone oligomer may be contained in a ratio of 20 to 500 parts by weight relative to 100 parts by weight of the bifunctional silicone oligomer. When the curable component further comprises a silicone oligomer having three or more functionalities, the silicone oligomer having three or more functionalities may be contained in a ratio of 2 to 50 parts by weight relative to 100 parts by weight of the bifunctional oligomer The reactive silicone oligomer may have a weight average molecular weight of, for example, 10,000 to 100,000, specifically 10,000 to 80,000, more specifically 10,000 to 70,000. When the weight average molecular weight of the reactive silicone oligomer satisfies the above range, a curable composition having excellent transparency, heat resistance and adhesive force can be provided. In this specification, the weight average molecular weight may mean a converted value of standard polystyrene measured by a gel permeation chromatography (GPC) method.

The hydroxyl-containing component contained in the curable composition may have a hydroxyl value (OH value) of 2 to 45 mg KOH/g. More specifically, the hydroxyl-containing component may have a hydroxyl value (OH value) of 4 to 40 mg KOH/g. Since the curable composition can increase the moisture content rate through the hydroxyl-containing component, the haze can be reduced in a high-temperature and high-humidity environment to ensure transparency. If the hydroxyl value of the hydroxyl-containing component is too low, it is not possible to effectively suppress the occurrence of haze in a high-temperature and high-humidity environment, and even if the hydroxyl value is too high, it is not possible to effectively suppress the occurrence of haze in a high-temperature and high-humidity environment, whereby adhesive durability can be lowered.

The hydroxyl-containing component may comprise a non-reactive silicone oligomer having a hydroxyl group. In this specification, the non-reactive silicone oligomer may mean a compound containing the polysiloxane skeleton but containing no curable functional group. The curable functional group may be exemplified by, for example, a (meth) acryl group. The non-reactive silicone oligomer may have at least one hydroxyl group at the terminals.

The non-reactive silicone oligomer may serve as a diluent in the curable composition. When the curable composition comprises the non-reactive oligomer as a diluent, the heat resistance can be further improved by reducing the (meth) acrylic group in a heat resistance improvement system to suppress decomposition reaction of the ester group by heat.

The curable composition may comprise the non-reactive silicone oligomer having a hydroxyl group in a ratio of 20 to 70 parts by weight. When the curable composition comprises a small amount of the non-reactive silicone oligomer, the haze may increase in a high-temperature and high-humidity environment as well as the modulus and viscosity may increase significantly. When the curable composition comprises an excess amount of the non-reactive silicone oligomer having a hydroxyl group, the adhesive durability may be deteriorated as well as the modulus and viscosity may be remarkably decreased.

The non-reactive silicone oligomer may comprise one or more oligomers of a non-reactive polysiloxane oligomer and a non-reactive polysiloxane modified urethane oligomer. While describing the oligomer herein, unless it is specifically defined as the urethane oligomer, it may mean an oligomer containing no urethane bond.

In one example, the non-reactive silicone oligomer may be a non-reactive polysiloxane oligomer. Such an oligomer may be represented by Formula 2 below.

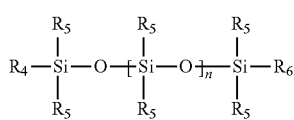

[Formula 2]

In Formula 2, $R_4$ and $R_6$ are each independently a hydrocarbon group or an organic group containing a hetero atom, an ether group or a hydroxyl group, each $R_5$ is independently an alkyl group, a cycloalkyl group or a phenyl group, n is an integer of 10 or more, and at least one of $R_4$ and $R_6$ is a hydroxyl group.

As the non-reactive polysiloxane oligomer, for example, silicone oil or a silicone fluid product, such as FM-0411, FM-0421, FM-0425, FMDA11, FM-DA21, FM-DA26, FM-4411, FM-4421, FM-4425 (Chisso), DMS-T00, DMS-T01, DMS-T02, DMS-T03, DMS-T05, DMS-T07, DMS-T11, DMS-T 12, DMS-T 15, DMS-T 21, DMS-T 22, 23, DMS-T25, DMS-T31, DMS-T 35, DMS-T 41, DMS-T 43, DMS-T 46, DMS-T 51, DMS-T53, DMS-T 56, PDM-0421, PDM-0821, PDM-1922, PMM-1015, PMM-1025, PMM-1043, PMM-5021, PMM-0011, PMM-0021, PMM-0025 (Gelest), X-22-4039, X-22-4015, KF-99, KF-9901, KF-6000, KF-6001, KF-6002. KF-6003, KF-6004, X-22-4952, X-22-4272, KF-6123, X-21-5841, KF-9701, X-22-170BX, X-22-170DX, X-22-176DX, X-22-176F, X-22-176GX-A, KF-6011, KF-6012, KF-6015 and KF-6017 (Shinetsu), can be used.

In one example, the non-reactive silicone oligomer may be a non-reactive polysiloxane-modified urethane oligomer. Such an oligomer may contain the polysiloxane skeleton and urethane bonds, and may have one or more hydroxyl groups at the terminals. The oligomer may have an alkyl group through a urethane bond at the terminal having no hydroxyl group. Such an oligomer may be a urethane reactant of a hydroxyl-containing polysiloxane; a polyfunctional isocyanate; and a monomer containing a hydroxyl group.

In one specific example, the hydroxyl-containing polysiloxane may be a compound represented by Formula 1 below.

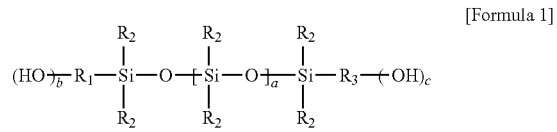

[Formula 1]

In Formula 1, $R_1$ and $R_3$ are each independently a hydrocarbon group or an organic group containing a hetero atom or an ether group, each $R_2$ is independently an alkyl group, a cycloalkyl group or a phenyl group, a is an integer of 10 or more, b and c are each independently an integer of 0 to 3, provided that the sum of b and c is 1 or more.

The described contents of the Formula 1 in the item of polysiloxane-based urethane (meth)acrylate may be equally applied to specific details regarding Formula 1 above. The described contents of the polyfunctional isocyanate in the item of polysiloxane-based urethane (meth)acrylate may be equally applied to details regarding the polyfunctional isocyanate. The monomer containing a hydroxyl group may have an alkyl group and/or an ether group at the terminal having no hydroxyl group. For example, the monomer containing a hydroxyl group may have an alkyl group having 1 to 12 carbon atoms or an alkoxy group having 1 to 12 carbon atoms.

The non-reactive silicone oligomer may have a weight average molecular weight (Mw) of 1,000 to 50,000. When the weight average molecular weight of the non-reactive silicone oligomer satisfies the above range, it is possible to provide a curable composition having excellent transparency, heat resistance and adhesive force.

The hydroxyl-containing component may further comprise a hydroxyl-containing reactive monomer. The curing composition may comprise the hydroxyl-containing reactive monomer in a ratio of 1 to 30 parts by weight.

The hydroxyl-containing reactive monomer may be exemplified by hydroxyalkyl (meth)acrylate or hydroxyalkylene glycol (meth)acrylate. A specific example of the hydroxyl-containing reactive monomer may be exemplified by hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or hydroxyalkylene glycol (meth)acrylate such as 2-hydroxyethylene glycol (meth)acrylate or 2-hydroxypropylene glycol (meth)acrylate, and the like.

The curable composition may further comprise an initiator. As the initiator, a photopolymerization initiator or a thermal polymerization initiator can be used. In one example, as the initiator, a photopolymerization initiator can be used, and for example, an ultraviolet polymerization initiator or a visible light polymerization initiator can be used. As the ultraviolet polymerization initiator, for example, benzoin series, benzophenone series or acetophenone series, and the like can be used, and as the visible light polymerization initiator, for example, acylphosphine oxide series, thioxanthone series, metallocene series, quinine series, α-aminoalkylphenone series, and the like can be used, without being limited thereto. The initiator may be contained in a ratio of 1 to 10 parts by weight relative to 100 parts by weight of the curable composition, but this may be suitably adjusted as needed.

The curable composition may further comprise a silane coupling agent. The silane coupling agent may serve to improve heat resistance and moisture resistance by enhancing adhesiveness and adhesive stability, and also to improve adhesion reliability even when left in a harsh condition for a long period of time. As the silane coupling agent, for example, γ-glycidoxypropyl triethoxysilane, γ-glycidoxypropyl trimethoxysilane, γ-glycidoxypropylmethyl diethoxysilane, γ-glycidoxypropyl triethoxysilane, 3-mercaptopropyl trimethoxysilane, vinyltrimethoxysilane, vinyltriethoxysilane, γ-methacryloxypropyl trimethoxysilane, γ-methacryloxypropyl triethoxysilane, γ-aminopropyl trimethoxysilane or γ-aminopropyl triethoxysilane, and the like can be used, and one or a mixture of two or more of the foregoing can be used. The silane coupling agent may be contained in a ratio of 1 to 10 parts by weight reative to 100 parts by weight of the curable composition, but this may be appropriately adjusted as needed.

The curable composition may further comprise an antioxidant. The antioxidant may be contained in a ratio of 0.01 to 5 parts by weight, more specifically 0.01 to 3 parts by weight, relative to 100 parts by weight of the curable composition, but this may be suitably adjusted as needed.

In addition to these, the curable composition may further comprise known additives such as an elastomer, a curing agent, a plasticizer, a filler, a colorant, an ultraviolet stabilizer, a toning agent, a reinforcing agent, a defoamer, a surfactant or a rust inhibitor depending on the intended use.

The curable composition may have an elastic modulus at 1 Hz after curing of 10,000 Pa to 100,000 Pa, specifically, 10,000 Pa to 80,000 Pa, or 10,000 Pa to 60,000 Pa and more specifically, 10,000 Pa to 40,000 Pa. The elastic modulus can be measured by Measurement Example 2. Modulus measurement to be described below. When the elastic modulus of the curable composition is within the above range, physical properties suitable for use as a filler for a display device can be realized.

The curable composition may have a viscosity at 1 Hz and 25° C. of 1,000 cp to 10,000 cp. The curable composition may have, specifically, a viscosity at 1 Hz and 25° C. of 3,000 cp to 6,000 cp. The viscosity can be measured by Measurement Example 3. Viscosity measurement to be described below. When the viscosity of the curable composition is in the above range, physical properties suitable for use as a filler for a display device can be realized.

The present application also relates to a use of the curable composition. As one example, the present application relates to a filler comprising a cured product of the curable composition. Since the curable composition has excellent transparency, heat resistance and adhesive force, it can be usefully used as a filler for display.

In this specification, the "cured product" may mean a material in a cured state. Furthermore, the curing herein may mean a process in which the composition expresses adhesiveness or tackiness through physical or chemical action or reaction of components contained in the composition.

The curing of the curable composition can be performed by a process of holding the composition at an appropriate temperature or a process of being irradiated with an appropriate active energy ray so that the curing of the curable components can proceed. When the maintenance at an appropriate temperature and the irradiation of an active energy ray are simultaneously required, the above processes can be carried out sequentially or simultaneously. Here, the irradiation of the active energy ray may be performed using, for example, a high-pressure mercury lamp, an electrodeless lamp or a xenon lamp, and the like, and the conditions such as a wavelength or a light quantity of the active energy ray to be irradiated may be selected within a range in which the curing can be appropriately performed.

In one example, the curing of the curable composition can be carried out by being irradiated with ultraviolet light having a wavelength band of about 150 nm to 450 nm at a light quantity of 1000 mJ/cm$^2$ to 6000 mJ/cm$^2$, but this can be suitably adjusted as needed.

In addition, the thickness after curing of the curable composition, that is, the thickness of the cured product may be 10 μm to 500 μm, specifically 100 μm to 300 μm, which can be appropriately adjusted as needed.

The present application relates to a display device comprising at least one air gap between optical members and comprising a cured product of the curable composition to fill the air gap. FIG. 1 exemplarily shows the display device. As exemplarily shown in FIG. 1, it is exemplarily shown that in the display device the cured product (40) of the curable composition fills a space between a touch panel (20) and a display panel (30) spaced apart by the spacer (10), a so-called air gap.

However, the structure and position of the air gap are not limited to FIG. 1, and the curable composition can be used for filling air gaps in various structures and positions of the optical members constituting the display device.

The display device may be exemplified by, for example, a liquid crystal display device, an organic electroluminescent device, a plasma display, or the like, but is not limited thereto.

As another example, the curable composition may also be usefully used for direct bonding between optical members constituting a display device. FIG. 2 exemplarily shows the display device. As exemplarily shown in FIG. 2, in the display device comprising the touch panel (20) and the display panel (30), it exemplarily shows the case that the cured product (40) of the curable composition directly attach the touch panel and the display panel.

As another example, the curable composition may be usefully used for direct bonding between a display device and other optical functional members. The optical functional member may be exemplified by a transparent plastic plate such as an acrylic plate (for example, a hard coating treatment or an antireflection coating may also be treated on one side or both sides), a PC (polycarbonate) plate, a PET (polyethylene terephthalate) plate or a PEN (polyethylene naphthalate) plate for the purpose of improving visibility or preventing breakage of the display device from external impact, a tempered glass (for example, a scattering prevention film may also be attached) or a touch panel input sensor, and the like.

When the cured product of the curable composition is applied to the display device, other components constituting the display device and the constitution method of the device are not particularly limited, and as long as the cured product is used, any material or method known in the relevant field can be adopted.

Advantageous Effects

The present application can provide a curable composition having excellent physical properties such as adhesive durability as well as maintaining transparency even in a high-temperature and high-humidity environment. Such a curable composition can be usefully used for direct bonding between a filler and an optical member of a display device.

BRIEF DESCRIPTION OF DRAWINGS

FIGS. 1 and 2 illustratively show a display device to which a cured product of a curable composition of the present application is applied.

MODE FOR INVENTION

Hereinafter, the curable composition of the present application will be described in more detail through Examples and Comparative Examples, but the scope of the present application is not limited by the following examples. Also, the physical properties and characteristics of Examples and Comparative Examples are measured as follows.

Measurement Example 1

Measurement of OH Value

In each curable composition of Examples and Comparative Examples, the hydroxyl value was measured using AT-510 equipment from Kyoto Electronics Co., Ltd. according to JIS K 155701 standard. The hydroxyl value is a number of mg of KOH (mg KOH/g) required for neutralizing acetic acid combined to the acetyl compound obtained from 1 g of polyol (a substance containing a plurality of hydroxyl-containing components).

Measurement Example 2

Measurement of Modulus

The curable compositions of Examples and Comparative Examples were each applied between the release-treated films, and then irradiated with ultraviolet light having a wavelength of 150 nm to 450 nm at a light quantity of about 4000 mJ/cm$^2$ using a metal halide UV lamp (D-bulb), and cured to be a thickness after curing of 1 mm. The cured product was tailored to prepare a circular sample having a diameter of 8 mm and a thickness of 1 mm, and then a storage elastic modulus (G') at 1 Hz was measured using an ARES-G2 Rheometer from TA instruments.
Measuring temperature: 25° C.
Measuring strain: 5%,
Measurement mode: frequency sweep mode Measurement Example 3

Measurement of Viscosity

In each curable composition of Examples and Comparative Examples, the viscosity at 1 Hz was measured using an ARES-G2 Rheometer from TA instruments.
Measuring temperature: 25° C.
Measuring strain: 10%
Measurement mode: frequency sweep mode Measurement Example 4

Measurement of Initial Haze

The curable compositions of Examples and Comparative Examples were each applied to soda lime glass (1T) and then cured under the same conditions as in the measurement of the modulus. The cured product was tailored to a diameter of 5 cm and a thickness of 150 μm to prepare a circular sample, and then the haze was measured at a temperature of 25° C. and a relative humidity of 50% using an NDH-5000 Haze meter from Nippon Denshoku under the turbidimeter ASTM D1003 standard.

Measurement Example 5

Measurement of Haze at High-Temperature and High-Humiditye

The sample of Measurement Example 4 was stored at a temperature of 85° C. and a relative humidity of 85% for 1000 hours, and then left at a temperature of 25° C. and a relative humidity of 50% for 1 hour. In the left sample, the haze was measured at a temperature of 25° C. and a relative humidity of 50% using an NDH-5000 haze meter from Nippon Denshoku under the turbidimeter ASTM D1003 standard.

Measurement Example 6

Evaluation of Adhesive Durability

The curable compositions of Examples and Comparative Examples were each applied between glasses and cured under the same conditions as in the measurement of the modulus. After the cured product was tailored to a diameter of 1.5 cm and a thickness of 200 μm to prepare a circular sample, the sample was left at 105° C. for 1000 hours. The adhesive force was measured while pulling the binding portion up and down at a speed of 12.7 mm/min using TA-XT2 plus from Texture Technology. The adhesive durability was determined according to the following evaluation criteria by comparing adhesive force before and after heat treatment.
<Evaluation criteria of adhesive durability>
O: no adhesive force change
Δ: adhesive force decrease
X: cured product melted and flowed down

Preparation Example 1

Preparation of Monofunctional Silicone Oligomer (A1)

Instruments

Thermometers, stirrers, water-cooled condensers, nitrogen gas

Manufacturing Method

In a flask, 350 g of polydimethylsiloxane diol of Formula A (Silaplane FM-4411, Chisso), 112 g of isophorone diisocyanate (isocyanate group content 37.8%) and 1 g of dibutyltin dilaurate were reacted at 60° C. for 5 hours. Next, 9.8 g of hydroxyethyl acrylate and 15.6 g of lauryl alcohol were dropped, the reaction was continued as such, and the reaction was terminated when the isocyanate group was lost.

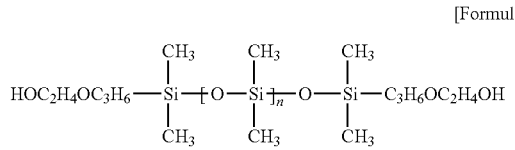

[Formula A]

Preparation Example 2

Preparation of Bifunctional Silicone Oligomer (A2)

Instruments

Thermometers, stirrers, water-cooled condensers, nitrogen gas

Manufacturing Method

In a flask, 350 g of polydimethylsiloxane diol of Formula A (Silaplane FM-4411, Chisso), 102.7 g of isophorone diisocyanate (isocyanate group content 37.8%) and 1 g of dibutyltin dilaurate were reacted at 60° C. for 5 hours. Next, 4.9 g of hydroxyethyl acrylate, 6.1 g of hydroxybutyl acrylate and 7.4 g of lauryl alcohol were dropped, the reaction was continued as such, and the reaction was terminated when the isocyanate group was lost.

Preparation Example 3

Preparation of Trifunctional Silicone Oligomer (A3)

Instruments

Thermometers, stirrers, water-cooled condensers, nitrogen gas

Manufacturing Method

In a flask, 350 g of polydimethylsiloxane diol of Formula A (Silaplane FM-4411, Chisso), 276.7 g of isophorone diisocyanate-isocyanurate (isocyanate group content 17.0%) and 1 g of dibutyltin dilaurate were reacted at 60° C. for 5 hours. Next, 50.7 g of hydroxyethyl acrylate was dropped, the reaction was continued as such, and the reaction was terminated when the isocyanate group was lost.

Preparation Example 4

Non-Reactive Silicone Non-Urethane Oligomer (B1)

Monohydroxylpolysiloxane (FM-0411, Chisso) of Formula B below was prepared as the non-reactive silicone non-urethane oligomer (B1).

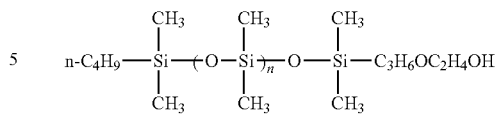

[Formula B]

Preparation Example 5

Preparation of Non-Reactive Silicone Urethane Oligomer (B2)

Instruments

Thermometers, stirrers, water-cooled condensers, nitrogen gas

Manufacturing Method

In a flask, 350 g of polydimethylsiloxane diol of Formula A (Silaplane FM-4411, Chisso), 124.4 g of isophorone diisocyanate (isocyanate group content 37.8%) and 1 g of dibutyltin dilaurate were reacted at 60° C. for 5 hours. Next, 52.2 g of lauryl alcohol was dropped, the reaction was continued as such, and the reaction was terminated when the isocyanate group was lost.

Preparation of Examples 1 to 4 and Comparative Examples 1 to 4

Preparation of Curable Composition

The sum of the curable oligomer and the diluent was set to be 100 parts by weight and the initiator (C1), the silane coupling agent (C2) and the antioxidant (C3) were compounded in the ratios of Table 1 to prepare curable compositions of Examples 1 to 4 and Comparative Examples 1 to 4.

TABLE 1

| Unit (part by weight) | | Example | | | | Comparative Example | | | |
|---|---|---|---|---|---|---|---|---|---|
| | | 1 | 2 | 3 | 4 | 1 | 2 | 3 | 4 |
| Curable Oligomer | A1 | 30 | 30 | 40 | 40 | 45 | — | 40 | — |
| | A2 | 20 | 30 | 20 | 20 | 40 | 30 | 30 | 20 |
| | A3 | — | — | 10 | — | — | — | — | — |
| Diluent | B1 | 50 | — | 20 | 10 | — | 30 | 5 | 75 |
| | B2 | — | 40 | — | 20 | 15 | — | — | — |
| | B3 | — | — | 10 | 10 | — | 40 | — | 5 |
| | B4 | — | — | — | — | — | — | 25 | — |
| Additive | C1 | 5 | 5 | 5 | 5 | 5 | 5 | 5 | 5 |
| | C2 | 5 | 5 | 5 | 5 | 5 | 5 | 5 | 5 |
| | C3 | 1 | 1 | 1 | 1 | 1 | 1 | 1 | 1 |

A1: monofunctional silicone oligomer (Mw: 40000),
A2: bifunctional silicone oligomer (Mw: 70000),
A3: trifunctional silicone oligomer (Mw: 10000),
B1: non-reactive silicone oligomer (Mw: 10000),
B2: non-reactive silicone urethane oligomer (Mw: 10000),
B3: hydroxybutyl methacrylate,
B4: lauryl acrylate,
C1: initiator (Irgacure 184, BASF),
C2: silane coupling agent (KBM-403, Shin-Etsu),
C3: antioxidant (Irganox 1010, BASF)

The physical property evaluation results of Examples and Comparative Examples were described in Tables 2 and 3 below.

TABLE 2

| | Example | | | |
|---|---|---|---|---|
| | 1 | 2 | 3 | 4 |
| Modulus (×10$^4$ Pa) | 2.5 | 3.4 | 5.9 | 2.9 |
| Viscosity (×10$^3$ cp) | 2.4 | 5.6 | 3.1 | 4.5 |
| Hydroxyl value (mg KOH/g) | 11 | 4 | 39 | 40 |
| Initial haze | 0.19 | 0.20 | 0.18 | 0.19 |
| Haze at high-temperature and high-humidity | 0.30 | 0.32 | 0.29 | 0.29 |
| Adhesive durability | ○ | ○ | ○ | ○ |

TABLE 3

| | Comparative Example | | | |
|---|---|---|---|---|
| | 1 | 2 | 3 | 4 |
| Modulus (×10$^4$ Pa) | 8.7 | 5.6 | 4.8 | 0.8 |
| Viscosity (×10$^3$ cp) | 12 | 1.2 | 5.3 | 0.5 |
| Hydroxyl value (mgKOH/g) | 1.6 | 148 | 1.1 | 34 |
| Initial haze | 0.20 | 2.5 | 0.20 | 0.21 |
| Haze at high-temperature and high-humidity | 1.9 | 4.8 | 2.3 | 0.32 |
| Adhesive durability | ○ | ○ | ○ | X |

EXPLANATION OF REFERENCE NUMERALS

10: spacer 20: touch panel
30: display panel 40: cured product of curable composition

The invention claimed is:

1. A curable composition comprising a curable component comprising 20 to 70 parts by weight of a reactive silicone oligomer, and a hydroxyl-containing component comprising 20 to 70 parts by weight of a non-reactive silicone oligomer having a hydroxyl group and having a hydroxyl value (OH value) of 2 to 45 mg KOH/g.

2. The curable composition according to claim 1, wherein a haze is 1.0% or less, as measured with the turbidimeter ASTM D1003 standard by storing a specimen, in which the curable composition is cured to a thickness of 150 μm, at a temperature of 85° C. and a relative humidity of 85% for 1000 hours, and then leaving it at a temperature of 25° C. and a relative humidity of 50% for 1 hour.

3. The curable composition according to claim 1, wherein the reactive silicone oligomer comprises a polysiloxane-based urethane (meth)acrylate.

4. The curable composition according to claim 1, wherein the reactive silicone oligomer comprises a monofunctional silicone oligomer and a bifunctional silicone oligomer.

5. The curable composition according to claim 4, wherein the reactive silicone oligomer further comprises a silicone oligomer having three or more functionalities.

6. The curable composition according to claim 1, wherein the reactive silicone oligomer has a weight average molecular weight (Mw) of 10,000 to 100,000.

7. The curable composition according to claim 1, wherein the non-reactive silicone oligomer comprises at least one oligomer of a non-reactive polysiloxane oligomer and a non-reactive polysiloxane modified urethane oligomer.

8. The curable composition according to claim 1, wherein the non-reactive silicone oligomer has a weight average molecular weight (Mw) of 1,000 to 50,000.

9. The curable composition according to claim 1, wherein the hydroxyl-containing component further comprises 1 to 30 parts by weight of a hydroxyl-containing reactive monomer.

10. The curable composition according to claim 9, wherein the hydroxyl-containing reactive monomer is hydroxyalkyl (meth)acrylate.

11. The curable composition according to claim 1, wherein the curable composition further comprises an initiator, a silane coupling agent or an antioxidant.

12. The curable composition according to claim 1, wherein the curable composition has an elastic modulus at 1 Hz after curing of 10,000 Pa to 100,000 Pa.

13. The curable composition according to claim 1, wherein the curable composition has a viscosity at 1 Hz and 25° C. of 1,000 cP to 10,000 cP.

14. A display device comprising at least one air gap between optical members, and comprising a cured product of the curable composition of claim 1 filling the air gap.

15. A display device comprising a display panel and a touch panel, wherein the display device further comprises a cured product of the curable composition of claim 1 attaching the display panel and the touch panel.

* * * * *